CONTINUOUSLY VARIABLE DIMMER SWITCH

Original Filed June 10, 1960 3 Sheets-Sheet 1

INVENTOR.
SAUL I. SLATER
BY
Darby & Darby
ATTORNEYS

CONTINUOUSLY VARIABLE DIMMER SWITCH

Original Filed June 10, 1960 3 Sheets-Sheet 2

INVENTOR.
SAUL I. SLATER
BY
Darby & Darby
ATTORNEYS

CONTINUOUSLY VARIABLE DIMMER SWITCH

Original Filed June 10, 1960 3 Sheets-Sheet 3

INVENTOR
SAUL I. SLATER
BY Darby & Darby
ATTORNEYS

United States Patent Office

Re. 26,119
Reissued Dec. 6, 1966

26,119

CONTINUOUSLY VARIABLE DIMMER SWITCH

Saul I. Slater, Glen Cove, N.Y., assignor to Slater Electric Inc., Glen Cove, N.Y., a corporation of New York Original No. 3,103,618, dated Sept. 10, 1963, Ser. No. 35,298, June 10, 1960. Application for reissue Nov. 16, 1965, Ser. No. 516,821
7 Claims. (Cl. 323—22)

Matter enclosed in heavy brackets [ ] appears in the original patent but forms no part of this reissue specification; matter printed in italics indicates the additions made by reissue.

This invention relates to power control devices, and more particularly to a continuously variable dimmer switch for applications such as lamp dimming and the like.

The present invention includes an improvement on and may be considered a continuation-in-part of my copending patent application Serial No. 3,144 for "Continuously Variable Dimmer Switch," filed January 18, 1960, *now abandoned, which had the same disclosure as my application Serial No. 250,458 for "Continuously Variable Dimmer Switch," filed January 4, 1963.*

The aforementioned copending patent application discloses a continuously variable dimmer switch having, in addition to full-on and full-off positions, a range of positions in which the power supplied to an electrical load device is continuously variable. The dimmer switch is a two terminal switch device which may be directly substituted for a standard, single-pole, single-throw switch in conventional, domestic electric outlet boxes and the like. Unlike many of the prior art devices, utilized for lamp dimming and similar applications, such as variable transformer or auto-transformers, for example, the aforesaid dimmer switch need only be connected into one side of the alternating current supply line to the load. Furthermore, it is of smaller size, lower cost and is more easily installed. The dimmer switch employs a silicon controlled rectifier which is coupled between the two switch terminals in series with the load device. A time delay circuit, such as a variable phase shift circuit, for example, is also coupled between the two switch terminals to provide a controllable gating signal for the gate electrode of the rectifier. By controlling the phase of the gating signal, it is possible to control the portion of an applied alternating current cycle over which the rectifier conducts, to thereby control the power supplied to the load. The variable phase shift circuit may comprise serially-coupled capacitor and variable resistance elements which are connected in parallel circuit with the rectifier across the switch terminals. The gate electrode of the controlled rectifier is coupled to the circuit junction of the capacitance and the variable resistance by means of a limiting resistor and a diode, so that a variation in the resistance of the circuit caused by adjustment of the variable resistance element varies the phase of the voltage applied to the gate element with respect to the phase of the switch terminal voltage, to thereby vary the power supplied to the load device in a manner somewhat similar to a grid-controlled thyratron. Additionally, the device disclosed in the aforesaid copending patent application may supply full power to the load device or may completely shut off the power to the load device by means of one or more switches which may be conveniently actuated by the same control means used to control the variable resistance in the phase shift circuit.

While the above-described continuously variable dimmer switch may be physically constructed to occupy an extremely small space, such as would comfortably fit into a standard electric outlet box, for example, it is nevertheless desirable to provide such a device which occupies a still smaller space and yet which is capable of handling reasonably large amounts of load power. For example, it is desirable that electric switch components be made of a small enough physical size to enable two or three of them to be mounted in a standard electric outlet box without exceeding the heat dissipation requirements imposed by the various safety codes. A common method of mounting a number of switches or other circuit devices in a standard outlet box makes use of a so-called "Despard" mounting strap which usually permits three such circuit devices to be supported in a single box. When a number of switches are mounted in this manner, the problem of heat dissipation becomes severe, due to the relatively small heat dissipation area available for each switch. Obviously, the silicon controlled rectifier produces a substantial amount of the heat to be dissipated. However, the variable resistance of the phase shift circuit also contributes to the heat output and, more importantly, also tends to limit the minimum physical size which the switch device may assume.

Accordingly, it is an object of this invention to provide a power control device which is capable of supplying substantial amounts of power to a load device over a substantial range of power values and yet which is capable of assuming an extremely small physical size.

It is another object of the present invention to provide a continuously variable light dimming circuit which is in all cases directly substitutable in a circuit which previously employed the customary single pole-single throw switch; that is, the circuit, according to the present invention, may be inserted where access is available to only one of the two lines leading to an electrical device to be controlled by the dimmer switch.

It is a further object of this invention to provide an improved continuously variable dimmer switch of the type disclosed in my aforementioned copending patent application for controlling electric lamps and the like, which improved dimmer switch occupies a much smaller physical space without diminishing its power handling capacity.

It is a still further object of this invention to provide a continuously variable dimmer switch which is of such a compact size as to enable a plurality of such switches to be mounted in a single standard size electric outlet box.

It will be useful to explain generally the advantages provided by the circuits described herein compared to that of my prior copending application Serial No. 3,144.

Briefly, for a given amount of load power-handling capacity, the physical size of the continuously variable dimmer switch depends to a large extent upon the size of the variable resistance in the phase shift circuit for the silicon controlled rectifier. Since, for a given power-handling capacity, the size of the silicon controlled rectifier is substantially fixed, and since the gating current required to control the rectifier is determined by the electrical characteristic of the rectifier, the required reduction in physical size is preferably obtained in the phase shift circuit. The present invention proposed to accomplish this by the inclusion of a simple, commercially available diode of small size serially coupled in the phase shift circuit with the capacitance and variable resistance. When such a diode is included in the phase shift circuit, the output of the diode which energizes the circuit contains a direct current component and an alternating current or "ripple" component. Accordingly, it is then possible to utilize a variable resistance of a much smaller size to provide substantially the same phase shift operation because of the reduction in the direct power to be handled by the circuit. Additionally, the presence of the diode in series with the phase shift circuit makes it possible to omit the diode previously employed with the limiting resistor in the input to the gate electrode of the silicon controlled rectifier without danger of damaging the rectifier. The improved continuously variable dimmer switch of the invention also includes means for dissipating the heat produced by the silicon controlled rectifier to enable a number of the smaller sized switches to be mounted in a single outlet box of standard size without exceeding a safe operating temperature.

Figure 1:
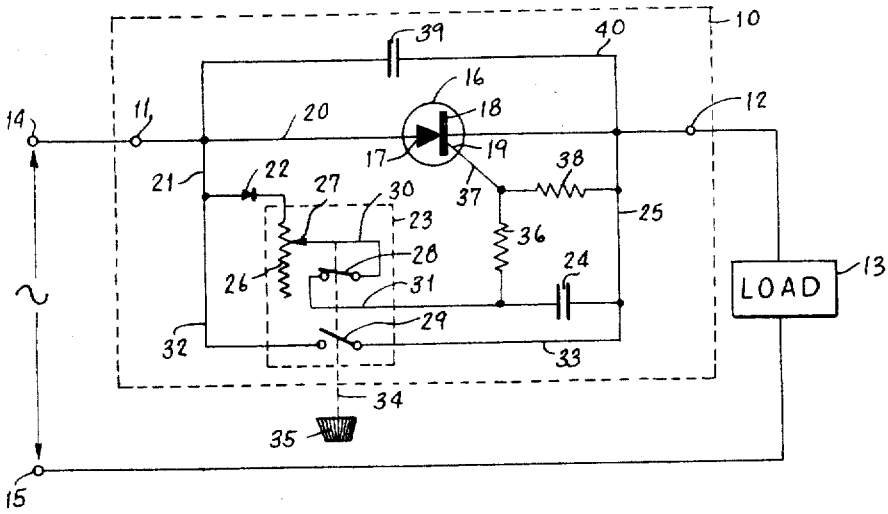
FIG. 1 is a schematic circuit diagram of the improved continuously variable dimmer switch of the present invention.

Referring now to FIG. 1 of the drawings, there is shown a continuously variable dimmer switch 10 constructed in accordance with the teachings of the present invention and having two switch terminals 11 and 12. The switch 10 is connected by the terminals 11 and 12 in series circuit with a load device 13 and the terminals 14 and 15 of a source of alternating voltage, which may, for example, be the conventional 115 volt, 60 cycle household power supply. In accordance with the usual wiring practice, the supply terminal 15 may be grounded, so that the switch 10 is connected in the "hot" side of the load supply line. The load 13 may comprise one or more incandescent lamps or certain types of other equipment, such as heaters or motors, for example. Since the dimmer switch provides a half-wave output having a direct current component, load devices suitable only for alternating current operation may not be employed. It will be noted that the switch 10 is a two terminal device having terminals 11 and 12, so that it need be connected in only one side of the line supplying the load 13. This is quite important since it permits the dimmer switch of the invention to be directly substituted for the usual, single-pole, single-throw switch customarily employed in household and other similar applications. The usual types of dimmer arrangement, such as those utilizing variable transformers or auto-transformers, for example, require that the dimmer device be connected into both sides of the power supply line, with the result that these devices cannot be wired into the usual household circuits without expensive alterations. The dimmer switch itself comprises a silicon controlled rectifier 16 having an anode electrode 17, a cathode electrode 18, and a gate electrode 19 and is serially connected between the switch terminals 11 and 12 by a lead 20. The silicon controlled rectifier 16 is a PNPN semi-conductor device which operates in a manner similar to a grid-controlled thyratron. The reverse current blocking characteristic of the silicon controlled rectifier is generally similar to that of silicon rectifiers or to other types of rectifiers. However, the forward current in the silicon controlled rectifier is controlled by a gating signal which is applied to the gating electrode 19 to institute or start forward conduction. Similar to the thyratron, the silicon controlled rectifier continues to conduct in a forward direction once conduction has been started, even after the gating signal has been removed. Unlike the thyratron, however, the gating or control signal for the rectifier is essentially a current signal rather than a voltage signal. Usually, in order to drive the rectifier into forward conduction, the gate electrode is biased positive with respect to the cathode electrode.

In operation, the silicon controlled rectifier 16 functions to control the power output to the load 13 by varying the portion of the alternating current cycle applied to terminals 11–12 over which the rectifier conducts. As explained in more detail in the aforementioned copending patent application, a time delay circuit, which may comprise a phase shift circuit, for example, is employed to control the point in the cycle of applied line voltage at which the rectifier 16 conducts and therefore controls the power applied to the load 13. To this end, switch terminal 11 is coupled by means of a lead 21, a diode 22, a variable resistance-switch assembly 23, a capacitor 24 and a lead 25 to the switch terminal 12. The variable resistance-switch assembly 23 comprises a variable resistance 26 having a movable wiper arm 27 and a pair of switches 28 and 29. Leads 30 and 31 serve to connect switch 28 in series circuit with the wiper arm 27 of the variable resistance and the capacitor 24. The switch 29 is connected in parallel with the silicon controlled rectifier 16 directly across the switch terminals 11 and 12 by means of leads 21, 32, 33 and 25. The wiper arm 27 of the variable resistance and the movable contacts of the switches 28 and 29 are mechanically interconnected as indicated schematically by the dotted line 34, so that these elements may be operated in a predetermined sequence by rotation of a control knob 35, as will be more fully explained hereinafter. The circuit junction of capacitor 24 and variable resistance 26 is connected to the gate electrode 19 of the silicon controlled rectifier 16 by means of a limiting resistance 36 and a lead 37. The gate electrode 19 is also connected to the cathode electrode 18 of the rectifier through lead 37, an adjusting resistor 38 and leads 25 and 20. Resistor 38 is employed to compensate for the variations in gate current encountered during a normal production run of the silicon controlled rectifier. Since, in a normal production run of such rectifiers, the gate or "trigger" current varies widely from rectifier to rectifier, the resistor 38 may be used to desensitize those rectifiers having a very low gate current, to thereby permit the values of the other circuit elements to be standardized. Accordingly, resistor 38 may be omitted, if desired, so that the potential at the gate electrode 19 is essentially the same as the potential at the circuit junction of capacitor 24 and variable resistance 26. Finally, a capacitor 39 is shunted directly across the controlled rectifier 16 and the switch terminals 11 and 12 by means of a lead 40 to minimize any interference with radio or television equipment which might be produced by the operation of the switch.

In operation, capacitor 24 and variable resistance 26 form a variable time delay or phase shift circuit in which the voltage appearing at the circuit junction of capacitor 24 and resistance 26 is of variable phase with respect to the phase of the voltage appearing at terminal 11 of the dimmer switch 10. When the variable resistance 26 is completely shorted out by moving the wiper arm 27 to the end of the resistance adjacent diode 22, the phase of the voltage measured at the circuit junction of the capacitor and variable resistance will be substantially the same as that measured at switch terminal 11. However, when the wiper arm 27 of the variable resistance 26 is moved to place some resistance into the circuit, the phase of the voltage at the circuit junction of the capacitor and variable resistance will lag the phase of the voltage appearing at switch terminal 11 by an amount generally proportional to the amount of resistance provided by the variable resistance 26. Since the phase of the voltage at the circuit junction of capacitor 24 and variable resistance 26 determines the phase of the gating signal applied to gate electrode 19 of the silicon controlled rectifier 16, it determines the point on the applied cycle of supply voltage at which the rectifier begin forward conduction and therefore determines the power output passed by the rectifier to the load 13. Accordingly, by actuating control knob 35 to vary resistance 26, it is possible to control the power supplied to load 13.

Since the diode 22 is in series circuit with the variable resistance 26 and the capacitor 24, the energizing source for the phase shift circuit will supply half-wave, pulsating direct current having a direct current component and an alternating current or "ripple" component of the same frequency as the line voltage at input terminals 14 and 15. By utilizing a half-wave rectifier or diode, the power that the variable resistance 26 must handle is very greatly reduced, so that it is possible to employ a variable resistance of greatly reduced physical size. It will be noted, of course, that the diode 22 still permits the required phase shift control for the controlled rectifier 16, since the capacitor 24 still is charged with a delay controllable by variable resistance 26. Furthermore, it is no longer necessary to employ a diode in lead 37 for the gate electrode 19, as in the dimmer switch of my aforementioned copending patent application, to assure that the gate control current will be of the correct polarity to prevent damage to the rectifier 16.

By suitably arranging the operating sequence of variable resistance 26 and switches 28 and 29 of the variable resistance-switch assembly 23, it is possible to apply full power or to completely shut off power to the load 13 in addition to providing a range of continuously controlled power. This may be accomplished by causing the mechanical interconnection 34 to maintain both switches 28 and 29 in an opened condition and the wiper arm 27 at the full resistance position of variable resistance 26 when the control knob 35 is in an "off" position, for example, at the extreme counterclockwise position of its range of rotation. At this time, the only direct connection to the load 13 from the input terminal 14 is through the silicon controlled rectifier 16. However, the rectifier is prevented from conducting because switch 28 is opened in the phase shift circuit. As the knob 35 is rotated in a clockwise direction, switch 28 is arranged to close and switch 29 remains open, so that the phase shift circuit becomes operable to control the conducting point of rectifier 16. *Switch 28 can be placed at any point along the conductive path to terminal 11 and may be between terminal 11 and leads 20 and 21 as in my application Serial No. 3,144, filed January 18, 1960, now abandoned.* As the knob 35 is rotated, less and less resistance is provided in the phase shift circuit by the variable resistance 26, so that the rectifier 16 conducts at points closer and closer to the start of the cycle of supply voltage. Therefore, the power supplied to load 13 gradually increases with clockwise rotation of knob 35 until the variable resistance 26 is completely shorted out. At this time, the mechanical interconnection 34 is arranged to close switch 29 to bypass rectifier 16 and thereby directly connect the load 13 across the input terminals 14 and 15. This "full-on" position, of course, applies full line voltage and power to the load. While continuous variability is not provided throughout the range from "off" to "full power" in the circuit of FIG. 1, the continuously variable range is particularly effective as a practical matter, when the switch is used in conjunction with incandescent lamps. At low powers, incandescent lamps have a marked drop in efficiency for the production of visible light, so that the variable dimmer switch readily allows the dimming of an incandescent lamp until its light output is about 2 percent of its maximum value. It is believed apparent that further dimming would be of relatively little value in the usual household application. When the dimmer switch of the invention is employed in household or similar applications, the capacitor 39 may be utilized as shown to shunt the rectifier 16 to minimize the effects of spurious frequencies produced by the rectifying action on radio and television sets and the like.

Figure 2:
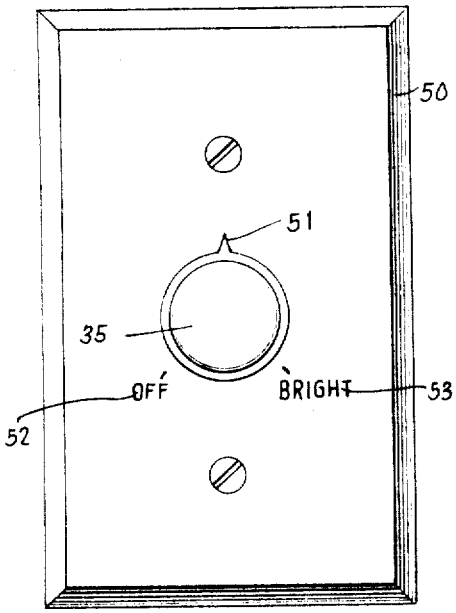
FIG. 2 is a front elevational view of a suitable switch-plate and housing for the dimmer switch of FIG. 1.
Figure 3:
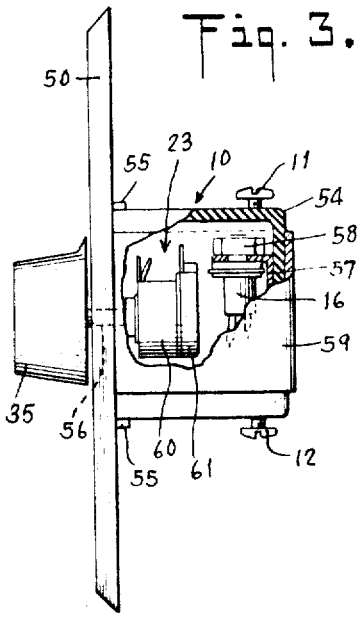
FIG. 3 is a side elevational view of the switch plate and housing of FIG. 2 with a portion of the housing broken away to reveal details of construction.

FIG. 2 of the drawings illustrates the improved dimmer switch of the invention mounted on a switch plate 50. The control knob 35 of the variable resistance-switch assembly 23 is provided with a pointer 51 which cooperates with an "Off" position marking 52 and a "Bright" position marking 53 on the face of the plate to provide an indication of the light level of the lamp or lamps which the switch is controlling. As seen in FIG. 3 of the drawings, the component parts of the dimmer switch 10 may be enclosed in a box-like housing 54 of plastic or other preferably non-conducting material. The housing 54 is provided with projections 55 which may be utilized to secure the switch to an interchangeable mounting plate or other device for supporting the switch in the usual electric outlet box. The variable resistance-switch assembly 23 is arranged to be controlled by the knob 35 by means of a single shaft 56. The silicon controlled rectifier 16 is mounted on a support plate 57 by means of a nut 58, so that the rectifier envelope maintains a good physical contact with the plate to enable good heat conduction to take place. The plate 57 is preferably made of copper or other material having good heat conductivity and extends along the rear and the two side walls of the housing 54 in close physical contact therewith. By virtue of this arrangement, the heat produced by the rectifier 16 is conducted along the plate 57 which forms a heat "sink" in the manner described in my copending patent application, Serial No. 5,000, filed January 27, 1960, for "Light Dimming Switch," now Patent No. 3,037,146, and is then transferred through the walls of the housing 54 over a broad area to enable it to be readily dissipated. If desired, an additional heat sink in the form of U-shaped plate 59 may be employed around the outside walls of the housing 54, as illustrated, to further aid in dissipating the heat generated by the rectifier 16. Furthermore, the additional heat sink 59 may be soldered to the mounting strap for the switch to provide a still further increase in heat dissipating area for the switch. The switch terminals 11 and 12 may be brought out through openings (not shown) formed in the top and bottom walls of housing 54 to facilitate the making of connections to existing house wiring. The remainder of the components for the dimmer switch, including diode 22, capacitors 24 and 39, and resistors 36 and 38 may be conveniently positioned in any space available in the housing 54 by supporting them directly on the wire leads to the components or by seating them in openings formed in the housing itself.

Figure 4:
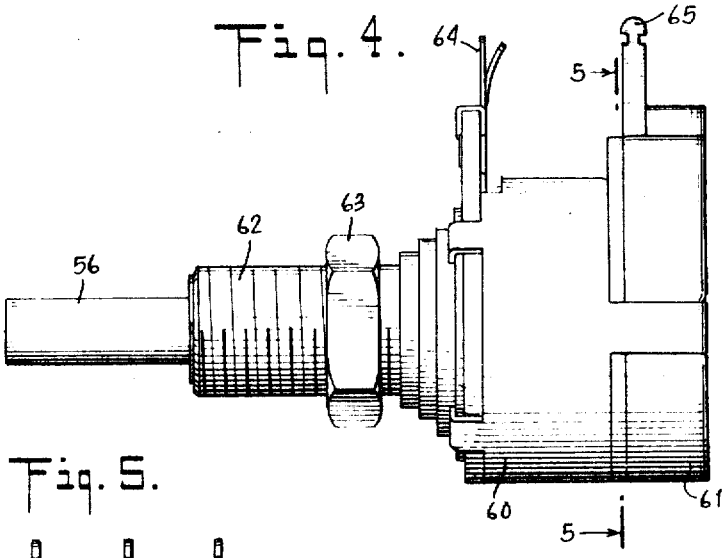
FIG. 4 is a side elevational view of a variable resistance and switch assembly which could be employed in the device of FIG. 1.
Figure 5:
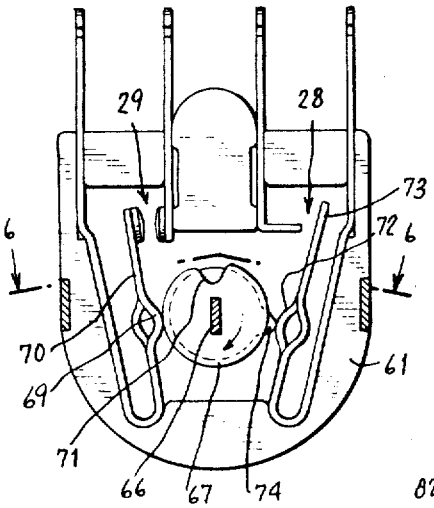
FIG. 5 is a sectional view taken along the line 5—5 of FIG. 4.
Figure 6:
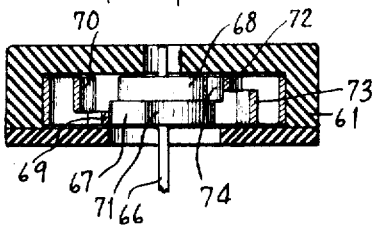
FIG. 6 is a sectional view taken along the line 6—6 of FIG. 5.

The structural details of a suitable mechanical arrangement for the variable resistance-switch assembly 23 of the dimmer switch are shown in FIGS. 4–6 of the drawings. As seen in FIG. 4, the assembly comprises a variable resistance portion 60, which may be a simple variable resistor of the type utilized in radio and television receiving sets, for example, and a switch portion 61 which is directly mounted on the housing of the variable resistance portion 60. The variable resistor 60 is actuated by rotation of control shaft 56 which is seated in a threaded sleeve 62 having a mounting nut 63 thereon. When the assembly is placed in the housing 54 of the switch, it may be secured to the front portion of the housing by means of the threaded sleeve 62 and the mounting nut 63. The terminals for the potentiometer 60 are indicated generally at 64 and the terminals for the switch portion 61 are indicated generally at 65. As seen in FIG. 5 of the drawings, the switch portion 61 is a substantially separate unit which is actuated by an extended, flattened portion 66 of the control shaft 56. The shaft portion 66 has mounted thereon a pair of cams 67 and 68 which respectively control the switches 29 and 28. Cam 67 is arranged to actuate switch 29 by means of a cam-follower projection 69 formed on the movable switch arm 70 of the switch 29. A recessed portion 71 is formed in the outer peripheral edge of the cam 67 to cooperate with the follower projection 69 when the control knob 35 is in the "full-on" or "Bright" position to close switch 29. Accordingly, for all positions of knob 35 other than the "Bright" position, the switch 29 remains open. The cam 68 cooperates with a cam-follower projection 72 formed on the movable switch arm 73 of switch 28. A projection 74 is formed on cam 68 and is arranged to engage the follower projection 72 on the movable switch arm to open switch 28 when the control knob 35 is rotated in a counterclockwise direction to reach its "Off" position. For all other positions of the control knob, the switch 28 is closed.

Figure 7:
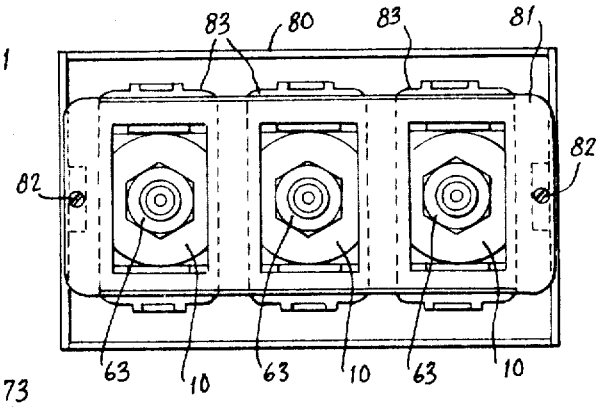
FIG. 7 is a front elevational view showing three of the improved continuously variable dimmer switches of the present invention mounted in a standard size electric outlet box.

Since the control shaft of the variable resistance-switch assembly 23 actuates both the wiper arm for the potentiometer 60 and the cams 67 and 68 of the switch portion simultaneously, it is apparent that a single control operated by rotation of knob 35 is provided to place the switch in any of its desired positions. Accordingly, the lamp or lamps forming the load for the dimmer switch of the invention may be turned completely off, or on to full brightness, or may be dimmed over a continuously variable range, all by means of a single operating control. By employing the diode 22, which may be a semiconductor, for example, in the phase shift circuit for the silicon controlled rectifier, it is possible to materially reduce the size of the variable resistance portion 60 of the variable resistance switch assembly 23, to thereby greatly reduce the overall physical size of the dimmer switch. As shown in FIG. 7 of the drawings, this permits a number of dimmer switches to be mounted in a single, standard size, electric outlet box 80. The three dimmer switches 10, constructed in accordance with the teachings of the present invention, are supported in the outlet box by means of a mounting strap 81 which is secured to the box by screws 82. The strap 81 may be of the "Despard" type, or may comprise any other convenient mounting arrangement as known in this art. Each of the dimmer switches 10 is secured to a separate, interchangeable mounting plate 83, which engages the projections 55 formed on the housing 54 of each switch and the mounting plates are, in turn, secured to the mounting strap 81.

Suitable circuit values for the dimmer switch shown in FIG. 1 of the drawings for use with a silicon controlled rectifier, such as a General Electric Co. Type C36B, for example, are given by way of illustration as follows:

Variable resistance 26—100,000 ohms, approximately ⅓ watt.
Capacitor 24—.5 mf., 25 volt D.C.
Capacitor 39—.25 mf., 200 volt A.C.
Resistor 36—7500 ohms.
Resistor 38—100 ohms and larger depending upon the gate current characteristic of the particular silicon controlled rectifier employed.

As hereinbefore explained, while continuous variability is not provided throughout the entire range from "off" to "full power," the dimmer switch of the invention is particularly effective for controlling incandescent lamps over a range of, for example, 2% to 30% of their rated light output. It may be noted that by the addition of an oppositely polarized diode in parallel with the silicon controlled rectifier 16 and appropriate switching, the range of power from 50% to 100% could be provided with substantially continuous control.

Figure 8:
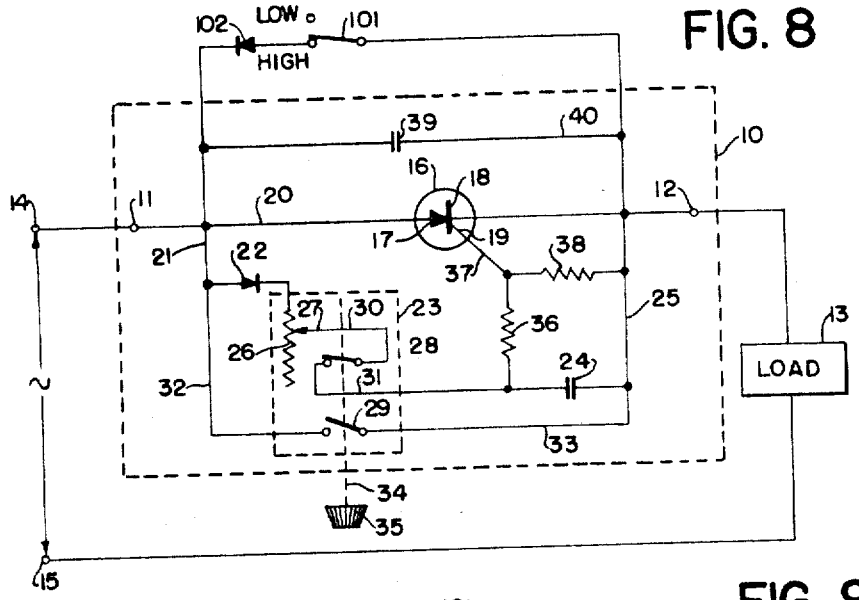
FIG. 8 is a schematic circuit diagram of an alternative form of variable dimmer switch according to the present invention.

Such an alternative form of circuit with a diode rectifier in parallel is shown in FIG. 8. The circuit of FIG. 8 includes the elements of the circuit of FIG. 1 and, in addition, a parallel circuit is provided between terminals 11 and 12 comprising a diode rectifier 102 polarized oppositely to the silicon controlled rectifier 16. In series with the diode rectifier 102, is a single-pole, single-throw switch 101.

When the switch 101 is moved to the positioned marked "Low" to open the circuit, the operation of the continuously variable dimmer switch is substantially as explained with reference to FIG. 1, and gives a continuously variable range of power between zero and fifty percent of full power. When switch 101 is moved to the position marked "High" and the parallel circuit is completed, it will be noted that one-half of the alternating current wave form will be shunted around the silicon controlled rectifier 16, and the minimum controllable power will be fifty percent of the full power. Adjustment of the silicon controlled rectifier circuit will then yield a range of continuously variable power between the values of fifty percent and one hundred percent full power.

Switch 29 and leads 32 and 33 to provide full power in FIG. 1 will generally be unnecessary in the circuit of FIG. 8, but may be retained and will provide the incidental advantage of relieving the load from the diode and silicon controlled rectifier during full power operation. Additionally, it is possible to employ two of the dimmer switches 10 of the invention in parallel circuit, but with opposite polarity, to give continuous power control above 50% of full power. This arrangement also has the added advantage of permitting the controls of the two dimmer circuits to be ganged together to reduce the average current to the load to zero, so that no substantial direct current component would exist to damage those load devices which are for energization by alternating current only.

Figure 9:
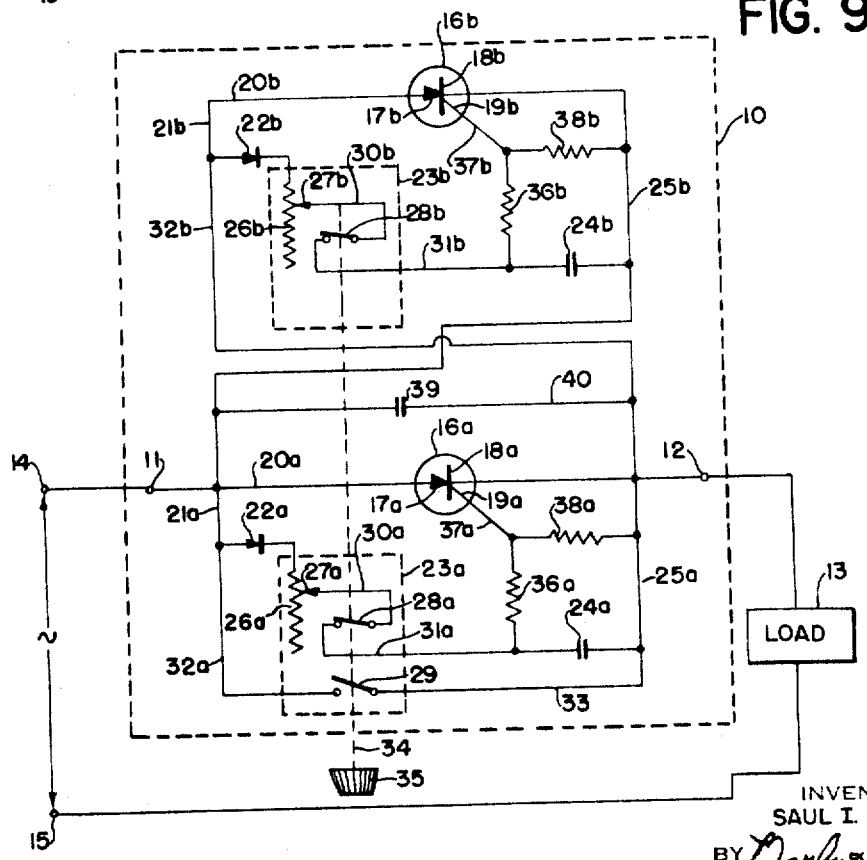
FIG. 9 is a schematic circuit diagram of a further alternative form of continuously variable dimmer switch according to the present invention.

Such an alternative form of double dimmer circuit arrangement is illustrated in FIG. 9, wherein the circuitry shown in the enclosure 11 of FIG. 1 is retained and substantially duplicated in FIG. 9, except that capacitor 39, leads 40, leads 32 and 33, and switch 29 are not duplicated, as such duplicate elements obviously would be superfluous.

In FIG. 9, elements are given the same reference numerals as in FIG. 1, except for the addition of the suffix *a* and the suffix *b* in the case of retained and duplicated elements, respectively.

Elements in the FIG. 9 circuit retained from the FIG. 1 circuit operate in the same manner, already explained with reference to FIG. 1. Duplicated elements in FIG. 9 also operate in a manner similar to the FIG. 1 circuit, except that it will be noted that silicon controlled rectifier **16*b* in FIG. 9 is connected with its associated circuitry between terminals 11 and 12 so that it is oppositely polarized with respect to the silicon controlled rectifier 16*a***. Thus each of the silicon controlled rectifiers operates substantially independently on opposite halves of the alternating current wave formation, and the range of continuous adjustment in terms of percentage of full power is doubled.

Usually it will be desirable to gang together the controls, as indicated by the dashed line in FIG. 6, in order that full-range control may be obtained with a single control. This also substantially eliminates any direct-current component through the load circuit, as previously explained.

It is believed apparent that many changes could be made in the above construction and many apparently widely different embodiments of this invention could be made without departing from the scope thereof. For example, other, similar devices could be substituted for the silicon controlled rectifier 16, and the half-wave diode 22 could be replaced by other types of rectifiers. Additionally, other physical forms for the variable resistance-switch assembly 23 could be utilized and other arrangements of the component parts of the switch could be employed if desired. Accordingly it is intended that all matter contained in the above description or shown in the accompanying drawings shall be interpreted as illustrative and not in a limiting sense.

What is claimed is:

1. A power control and switch device providing substantially continuous control of power supplied to a load over a substantial range of power values comprising two terminals for connecting said device in series in one side of the two sides of the power line from an alternating current power source supplying current to the load, a rectifier element having a cathode, anode and gating electrode, a switch, means connecting said rectifier element between said terminals to cause said rectifier element to be connected by means of its cathode and anode terminals in series between said two terminals, means connecting said switch between said two terminals to selectively provide a separate electrical path between said two terminals, and a variable time delay means energized from said two terminals for providing a gating signal to the gating electrode of said rectifier element, said gating signal being controllable to initiate conduction by said rectifier element at instants of time bearing a controllable relation with respect to the beginning of alternating current cycles of power available at said two terminals, whereby a portion of each alternating current cycle, which portion is continuously controllable in duration over a predetermined range, may be supplied to the load connected in circuit with said device.

2. Apparatus as claimed in claim 1 wherein said rectifier element is a controlled rectifier and further including a further rectifier element and means for connecting the last said rectifier element in shunt between said two terminals with its polarization opposite to that of said controlled rectifier.

3. Apparatus as claimed in claim 1 further including a secondary circuit substantailly the duplicate of that of said device of claim 1, said secondary circuit being connected in shunt between said two terminals with its polarization opposite to that of the said rectifier of claim 1.

4. A power control device as claimed in claim 1, further comprising a housing and a member for mounting said rectifier element, said member being formed of a good heat conducting material and extending along at least a portion of the walls of said housing interiorly thereof, so that said member acts as a heat sink to dissipate the heat produced by said rectifier.

[5. A power control device providing substantially continuous control of power supplied to a load over a substantial range of power values, comprising two terminals for connecting said device in series circuit in one side of the two sides of a power line supplying current to the load; a control rectifier having the anode and cathode electrodes thereof serially coupled between said terminals, said rectifier being of the type having a gate electrode in addition to said anode and cathode electrodes for controlling the forward conduction thereof; a variable time delay circuit including a capacitor, said delay circuit having the input thereof serially coupled between said terminals and the output thereof coupled to the gate electrode of said controlled rectifier and unidirectional current conducting means connected in series with said capacitor to provide a unidirectional current path through said capacitor from one to the other of said terminals, whereby said delay circuit is adapted to control the portion of an alternating current cycle applied to said terminals over which said rectifier conducts to thereby control the power applied to the load.]

[6. A power control and switch device providing substantially continuous control of power supplied to a load over a substantial range of power values comprising two terminals for connecting said device in series in one side of the two sides of the power line from an alternating current power source supplying current to the load, a semiconductor control element having first and second electrodes, said control element normally being substantially non-conductive between said first and second electrodes and being adapted to be rendered conductive in at least one direction by a control signal, means connecting said control element in series between said two terminals by means of its first and second electrodes, and a variable time delay means energized from said two terminals for providing a control signal to said control element said control signal being controllable to initiate conduction by said control element at instants of time bearing a controllable relation with respect to alternating current cycles of power available at said two terminals, whereby portions of alternating current cycles, which portions are continuously controllable in duration over a predetermined range, may be supplied to the load connected in circuit with said device.]

[7. A power control and switch device providing substantially continuous control of power supplied to a load over a substantial range of power values comprising two terminals for connecting said device in series in one side of the two sides of the power line from an alternating current power source supplying current to the load, a semiconductor control element having first and second electrodes, said control element normally being substantially nonconductive between said first and second electrodes and being adapted to be rendered conductive in at least one direction by a control signal, means connecting said control element in series between said two terminals by means of its first and second electrodes, a variable time delay means energized from said two terminals for providing said control signal to said control element, a switch and means connecting said switch to selectively open the circuit for said control signal between one of said terminals and said control element, said control signal being controllable by said time delay means to initiate conduction by said control element at instants of time bearing a controllable relation with respect to alternating current cycles of power available at said two terminals, whereby portions of alternating current cycles, which portions are continuously controllable in duration over a predetermined range may be supplied to the load connected in circuit with said device.]

*8. A power control and switch device for use as a wiring device to be installed in a building providing substantially continuous control of power supplied to a load over a substantial range of power values, said device comprising an insulating housing adapted to fit in an outlet box, two terminals for connecting said device in series in one side of the two sides of the power line from an alternating current power source supplying current to the load, said power line comprising conductors of a building wiring circuit, means for respectively connecting said terminals to conductors comprising said one side of said power line, a semiconductor control element within said housing having first and second electrodes, said control element normally being substantially non-conductive between said first and second electrodes and being adapted to be rendered conductive in at least one direction by a control signal, means within said housing connecting said control element in series between said two terminals by means of its first and second electrodes, variable time delay means within said housing energized from said two terminals for providing a control signal to said control element, within said housing a mechanical switch arranged to selectively open the circuit for said control signal between one of said terminals and said control element, and a continuously variable manually operable control member for said time delay means extending outside said housing, said mechanical switch being mechanically coupled to said control member and said time delay means being controllable by operation of said control member to initiate conduction by said control element at instants of time bearing a controllable relation with respect to alternating current cycles of power available at said two terminals, whereby portions of alternating current cycles, which portions are continuously controllable in duration over a predetermined range, may be supplied to the load connected in circuit with said device.*

*9. A power control and switch device for use as a wiring device to be installed in a building providing substantially continuous control of power supplied to a load over a substantial range of power values, said device comprising an insulating housing adapted to fit in an outlet box, two terminals for connecting said device in series in one*

*side of the two sides of the power line from an alternating current power source supplying current to the load, said power line comprising conductors of a building wiring circuit, means for respectively connecting said terminals to conductors comprising said one side of said power line, a semiconductor control element within said housing having first and second electrodes, said control element normally being substantially non-conductive between said first and second electrodes and being adapted to be rendered conductive in at least one direction by a control signal, means within said housing connecting said control element in series between said two terminals by means of its first and second electrodes, variable time delay means within said housing energized from said two terminals for providing a control signal to said control element, a mechanical switch within said housing arranged to selectively open the energization circuit for said time delay means and a manually operable control member for said time delay means extending outside said housing, said switch being mechanically connected to said control member for actuation thereby, and said time delay means being controllable by operation of said control member to initiate conduction by said control element at instants of time bearing a controllable relation with respect to alternating current cycles of power available at said two terminals, whereby portions of alternating current cycles, which portions are continuously controllable in duration over a predetermined range, may be supplied to the load connected in circuit with said device.*

*10. A power control and switch device for use as a wiring device to be installed in a building providing substantially continuous control of power supplied to a load over a substantial range of power values, said device comprising an insulating housing having front, side, and back sections adapted to fit in an outlet box flush with the front thereof, two terminals for connecting said device in series in one side of the two sides of the power line from an alternating current power source supplying current to the load, said power line comprising conductors of a building wiring circuit, means for respectively connecting said terminals to conductors comprising said one side of said power line present in said outlet box, a semiconductor control element secured within said housing having first and second electrodes, said control element normally being substantially non-conductive between said first and second electrodes and being adapted to be rendered conductive in at least one direction by a control signal, means within said housing connecting said control element in series between said two terminals by means of its first and second electrodes, a first capacitor directly connected between said two terminals, variable time delay means including a second capacitor and means for varying its charging rate within said housing energized from said two terminals for providing a control signal to said control element, a mechanical switch arranged to selectively open the circuit for said time delay means between one of said terminals and said control element, and a continuously variable manually operable control member for said time delay means extending through the front portion of said housing, said mechanical switch being mechanically coupled to said control member to provide positive cut-off of current through said time delay means and said control element and said time delay means being controllable by operation of said control member to selectively initiate conduction by said control element at instants of time bearing a controllable relation with respect to alternating current cycles of power available at said two terminals, whereby portions of alternating current cycles, which portions are continuously controllable in duration over a predetermined range, may be supplied to the load connected in circuit with said device.*

References Cited by the Examiner

The following references, cited by the Examiner, are of record in the patented file of this patent or the original patent.

UNITED STATES PATENTS

| | | | |
|---|---|---|---|
| 2,001,837 | 5/1935 | Craig | 323—22 X |
| 2,896,125 | 5/1957 | Morton | 315—272 |
| 2,877,359 | 3/1959 | Ross | 307—88.5 |
| 2,920,240 | 1/1960 | Macklem | 315—201 |
| 2,981,866 | 4/1961 | Tsien | 315—272 |
| 3,061,744 | 3/1962 | Spira | 307—146 |
| 3,032,688 | 5/1962 | Spira | 315—272 |
| 3,128,440 | 4/1964 | Davis | 323—60 |

OTHER REFERENCES

1. Notes on the Application of the Silicon Controlled Rectifier, Semiconductor Products Department of the General Electric Company, December 1958, pp. 41–43.

2. A Survey of Some Circuit Applications of the Silicon Controlled Switch and Silicon Controlled Rectifier, Applications and Circuit Design Notes of the Solid State Products, Inc., August 1959. Bulletin D420–02–8–59, p. 27.

JOHN F. COUCH, *Primary Examiner.*

ORIS L. RADER, *Examiner.*

K. D. MOORE, J. B. SOTAK, G. P. HAAS,
*Assistant Examiners.*

UNITED STATES PATENT OFFICE

CERTIFICATE OF CORRECTION

Reissue No. 26,119 December 6, 1966

Saul I. Slater

It is hereby certified that error appears in the above numbered patent requiring correction and that the said Letters Patent should read as corrected below.

Column 1, line 34, after "devices" strike out the comma; column 5, line 8, for "begin" read -- begins --; column 10, line 54, strike out "within said housing" and insert the same after "switch" in same line 54, same column 10.

Signed and sealed this 5th day of September 1967.

(SEAL)
Attest:

ERNEST W. SWIDER
Attesting Officer

EDWARD J. BRENNER
Commissioner of Patents